(12) United States Patent
Moon et al.

(10) Patent No.: US 11,035,963 B2
(45) Date of Patent: Jun. 15, 2021

(54) METHOD FOR DETECTING RADIONUCLIDE, PROCESS FOR DETECTING RADIONUCLIDE USING THE SAME, AND RADIATION DETECTOR FOR THE SAME

(71) Applicant: KOREA ATOMIC ENERGY RESEARCH INSTITUTE, Daejeon (KR)

(72) Inventors: Myung Kook Moon, Daejeon (KR); Joo Hyun Lee, Daejeon (KR); Ki Seo Lim, Seoul (KR); Byoungil Jeon, Daejeon (KR); Nam-Ho Lee, Jeollabuk-do (KR); Jong Yul Kim, Daegu (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 217 days.

(21) Appl. No.: 16/339,470

(22) PCT Filed: Oct. 13, 2017

(86) PCT No.: PCT/KR2017/011314
§ 371 (c)(1),
(2) Date: Apr. 4, 2019

(87) PCT Pub. No.: WO2018/101598
PCT Pub. Date: Jun. 7, 2018

(65) Prior Publication Data
US 2020/0041661 A1   Feb. 6, 2020

(30) Foreign Application Priority Data

Dec. 2, 2016 (KR) .......................... 10-2016-0163218
Aug. 21, 2017 (KR) .......................... 10-2017-0105717

(51) Int. Cl.
*G01T 1/167* (2006.01)
*G01T 1/203* (2006.01)

(52) U.S. Cl.
CPC .............. *G01T 1/167* (2013.01); *G01T 1/203* (2013.01)

(58) Field of Classification Search
CPC ............ G01T 1/167; G01T 1/203; G01T 1/20
See application file for complete search history.

(56) References Cited

U.S. PATENT DOCUMENTS 6,302,355 B1 * 10/2001 Sallee .................... F41G 7/2226
244/3.15
2008/0067390 A1   3/2008 Ramsden et al.
(Continued)

FOREIGN PATENT DOCUMENTS

JP   S63-045583 A   2/1988
JP   2003-194953 A   7/2003
(Continued)

OTHER PUBLICATIONS

International Search Report and Written Opinion of the International Searching Authority dated Jan. 31, 2018 in corresponding International application No. PCT/KR2017/011314; 13 pages.

*Primary Examiner* — Manuel A Rivera Vargas
(74) *Attorney, Agent, or Firm* — Maier & Maier, PLLC (57) ABSTRACT

A method for detecting a radionuclide using energy spectrum data represented by a count depending on energy obtained from a radiation detector, including: calculating a count ratio for a particular energy value using a background energy spectrum data measured without a target object to detect the radionuclide and a target energy spectrum measured in the presence of the target object; and comparing a background count ratio and a target object count ratio, where the count ratio is a ratio of a low count sum of count values which is an energy value or less divided by a high count sum (Continued)

of the count values which is greater than the particular energy value, or a ratio of the low count sum of the count values which is smaller than the particular energy value divided by the high count sum of the count values which is the particular energy value or greater.

8 Claims, 6 Drawing Sheets

(56) References Cited

U.S. PATENT DOCUMENTS

2014/0367582 A1* 12/2014 Boardman .............. G01T 1/16
                                                                            250/395
2018/0284296 A1* 10/2018 Kim ..................... G01T 1/362

FOREIGN PATENT DOCUMENTS

| JP | 2016-095134 A | 5/2016 |
|---|---|---|
| JP | 2017-227607 A | 12/2017 |
| KR | 10-2008-0015497 A | 2/2008 |
| KR | 10-2010-0033175 A | 3/2010 |
| KR | 10-1581004 B1 | 12/2015 |
| KR | 10-2016-0060208 A | 5/2016 |
| KR | 10-2016-0121140 A | 10/2016 |

* cited by examiner

METHOD FOR DETECTING RADIONUCLIDE, PROCESS FOR DETECTING RADIONUCLIDE USING THE SAME, AND RADIATION DETECTOR FOR THE SAME

FIELD

The present invention relates to a method for detecting a radionuclide, a process for detecting a radionuclide using the same, and a radiation detecting device for the same.

ART

A radiation measurement for measuring whether radiation is emitted from a target object is widely used not only in the fields such as a nuclear or medical facility or the like, but also in a variety of fields such as a cargo-shipping in an airport or harbor. For example, Korean Patent No. 1581004 ("Radiation Detecting System for Incoming and Outgoing System Vehicles", hereinafter "prior art no. 1") discloses a technology for detecting the presence of radiation in a vehicle passing through a door, while being installed on the door. According to the prior art no. 1, the system comprises a plastic scintillator which generates scintillation by receiving a ray source of a predefined wavelength, and analyzing a scintillation signal generated at the scintillator by the radiation emitted from the target object so as to measure whether it includes the radiation or not.

The following is a more detailed description regarding the scintillator. The inorganic scintillator such as NaI(TL) allows to measure the energy of the incident radiation by generating photon of a predefined intensity proportional to the energy of the incident radiation. Therefore, the inorganic scintillator is mainly used for a nuclide analysis on the basis of energy and intensity of the incident radiation. Meanwhile, an organic scintillator such as PVT (Polyvinyltoluene) is measured with the intensity only, since it is difficult to measure the energy of the incident radiation due to its low density and a low probability of interacting with the incident radiation by photoelectric effect. However, a plastic organic scintillator is widely used for detecting the radiation inside a cargo, since it can be easily manufactured compared to the inorganic scintillator and it is possible to manufacture as a large size of m2 or greater. As the radiation detecting system of the prior art no. 1 described above also uses the plastic scintillator, i.e., the organic scintillator, a PVT plastic scintillator having a volume in a range of 25 L to 65 L is used for a cargo radiation detecting system installed on an entrance door of the airport or harbor.

Meanwhile, such radiation detecting system is required with a function to determine whether an artificial radiation is included, i.e. the radionuclide of the artificial radiation, in addition to determining simply whether the radiation is included or not. As described above, in case of using the inorganic scintillator for the radiation detector, it is easy to determine whether there is the artificial radiation, since the energy and intensity of the radiation are measured to allow the nuclide analysis. However, in case of using the organic scintillator for the radiation detector, only the intensity of the radiation is mainly measured and thus it is required to distinguish the artificial radiation and the natural radiation.

For now, the method for distinguishing the natural radiation and the artificial radiation involves the methods such as a method to directly compare the energy spectrum data measured by the plastic scintillator and the background spectrum data, and a method to determine by applying weights to each energy of the energy spectrum measured by the plastic scintillator, and the like. The first method, i.e., the method to directly compare the spectrum data, is disclosed in detail in Korean Patent Publication No. 2016-0060208 ("METHOD AND APPARATUS FOR DISTINGUISHING RADIONUCLIDES USING PLASTIC SCINTILLATION DETECTOR", hereinafter "the prior art no. 2"), and the second method, i.e., the method of applying weights to energies, is disclosed in detail in Korean Patent Publication No. 2010-0033175 ("A RADIATION DETECTOR BASED ON PLASTIC SCINTILLATOR AND THE RADIONUCLIDE-DETECTION METHOD USING THE SAME", hereinafter "the prior art no. 3").

However, since the duration of the vehicle passing is 3 seconds to 10 seconds considering the speed (18 km/h in maximum) and length (15 m in maximum) of the vehicle passing through the cargo radiation detecting system, both of the aforementioned methods are not practically used unless the radiation of a significant level is detected. Furthermore, the determination condition may be even more difficult when there are various types of radiation source.

SUMMARY

The present invention relates to a method for detecting a radionuclide, a process for detecting a radionuclide using the same, and a radiation detecting device for the same.

To achieve the above purpose, the present invention provides the following.

According to a first aspect of the present invention, the present invention provides a method for detecting a radionuclide using energy spectrum data represented by a count depending on energy obtained from a radiation detector, comprising the following steps of: respectively calculating a count ratio for a particular energy value using a background energy spectrum data measured without a target object to detect the radionuclide and a target energy spectrum measured in the presence of the target object; and comparing a background count ratio and a target object count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

According to a second aspect of the present invention, the present invention provides a method for the detecting radionuclide using the energy spectrum data represented by the count depending on energy obtained from the radiation detector, comprising the steps of: respectively calculating a count ratio for a particular energy value using a background energy spectrum data measured without the target object to detect the radionuclide and a target energy spectrum measured in the presence of the target object; calculating a normalized count ratio for calculating a target object normalized count ratio represented by a normalized value depending on the energy from the target object count ratio, where the normalized value is defined as a ratio of the target object count ratio with respect to the particular energy value and the background count ratio; and searching the energy value where the normalized value is 1 in the target object normalized count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

According to a third aspect of the present invention, the present invention provides a process of detecting the radionuclide using the method of detecting the radionuclide of claim 1 and a radiation detector, comprising the steps of: measuring an energy spectrum data of measuring a background energy spectrum data without an object using the radiation detector, and a target energy spectrum data with the target object using the radiation detector; and detecting the radionuclide by sequentially calculating the count ratio when a count of the target energy spectrum data is a detection reference value or greater, and comparing the count ratio.

According to a fourth aspect of the present invention, the present invention provides a process of detecting the radionuclide using the method of detecting the radionuclide of claim 1 and a radiation detector, comprising the steps of: measuring an energy spectrum data of measuring a background energy spectrum data without an object using the radiation detector, and a target energy spectrum data with the target object using the radiation detector; and detecting the radionuclide by sequentially calculating the count ratio when the count of the target energy spectrum data is a detection reference value or greater, calculating a normalized count ratio, and searching the energy value where the normalized value is 1.

According to a fifth aspect of the present invention, the present invention provides a radiation detector of measuring the background energy spectrum without the target object and the target energy spectrum with the target object, comprising:

a calculating unit for performing a count ratio calculation with respect to the particular energy value using the energy spectrum data represented by the count for the energy obtained from the radiation detector; and a determining unit for distinguishing the radionuclide by comparing the background count ratio and the target object count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

According to the method for detecting the radionuclide of the present invention, it is possible to determine the nuclide in a highly effective and easy manner even for a radiation of lower energy level, by introducing a novel equation and algorithm. Furthermore, the method may be promptly applied to an existing radiation detection system by introducing the novel equation and algorithm of the present invention, with no need for adopting an additional device or component to the existing system, with a maximized compatibility with the existing radiation detection system.

Additionally, the method has effects in an expanded usage to a variety of target objects such as cargo shipping, radiation wastes, and foods, etc., with the advantage of easily detecting the radionuclide.

Advantageous Effects

According to the method for detecting the radionuclide of the present invention, it is possible to determine the nuclide in a highly effective and easy manner even for a radiation of lower energy level, by introducing a novel equation and algorithm. Furthermore, the method may be promptly applied to an existing radiation detection system by introducing the novel equation and algorithm of the present invention, with no need for adopting an additional device or component to the existing system, with a maximized compatibility with the existing radiation detection system.

Additionally, the method has effects in an expanded usage to a variety of target objects such as cargo shipping, radiation wastes, and foods, etc., with the advantage of easily detecting the radionuclide.

DETAILED DESCRIPTION

According to the first aspect of the present invention, the present invention provides a method for detecting a radionuclide using energy spectrum data represented by a count depending on energy obtained from a radiation detector, comprising the following steps of: respectively calculating a count ratio for a particular energy value using a background energy spectrum data measured without a target object to detect the radionuclide and a target energy spectrum measured in the presence of the target object; and comparing a background count ratio and a target object count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

Figure 1:
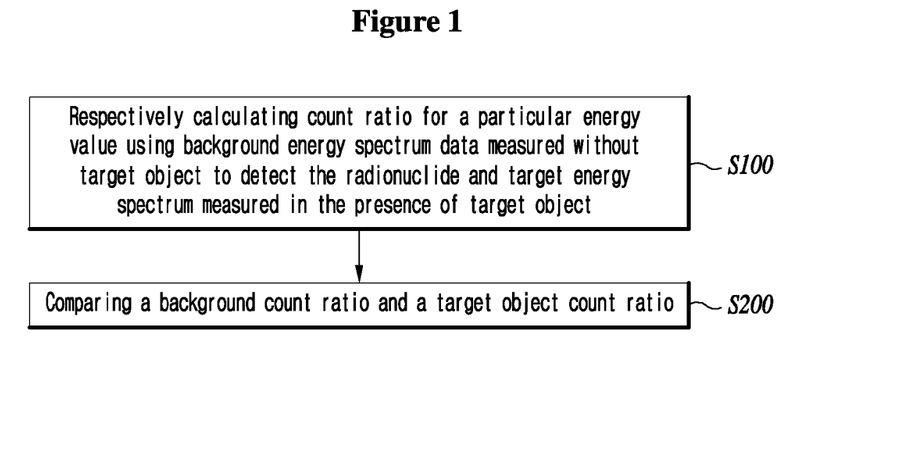
FIG. 1 is a schematic view to show a method for detecting a radionuclide, according to the present invention.

The method for detecting the radionuclide according to the first aspect of the present invention is described in details with reference to FIG. 1.

First of all, the present invention is provided to detect the radionuclide in order to distinguish the natural radiation and the artificial radiation, which are defined as follows. It is already known that the radiations of a predefined level or less does not significantly influence to human body, and the natural radiation is the minor radiation emitted from the object in the natural environment. Meanwhile, the artificial radioactive materials such as cesium (Cs-137) and cobalt (Co-60), etc. emit the radiation which is greater than the natural radiation, which may have harmful influences to the human body if the irradiation dose becomes higher. Thus, the method for detecting the radionuclide of the present invention is provided to detect the artificial radiation harmful to the human body.

Additionally, the detection of the radionuclide is to detect the radionuclide of a particular radiation which is suspected to be emitted from a particular radiation material, by comparing to the natural radiation measured in a state with no object (which is generally referred to as a background condition). Therefore, the most fundamental step of detecting the radionuclide is to obtain an energy spectrum data using a radiation detector.

Meanwhile, the method for detecting the radionuclide of the present invention is provided to use an existing radiation detector and detection system as it is without introducing a new device or component, while introducing a novel equation and algorithm. In this aspect, since the present invention adopts the existing radiation detector or the existing method for obtaining the energy spectrum data, the description for the same is provided only briefly as follows.

The following is a brief description of how to obtain the energy spectrum data from a radiation detector. For example, when the radiation detector is the detector using the plastic scintillator, the scintillation signal from the plastic scintillator is generated if the radiation from the target object is emitted to the plastic scintillator. This scintillation signal is converted into an electrical signal and amplified in size, and converted into a signal appropriate for an analysis by removing noises. The converted signal is represented in a pulse format, and the pulse is counted and segmented and stored depending on a voltage size. Each of process of counting the pulse of each voltage value and managed for a predefined time period is referred as the energy. According to this process, the energy spectrum data is obtained as the count value depending on the energy value. As mentioned above, the radiation detector using the plastic scintillator will obtain the energy spectrum data in such manner (all the prior arts no. 1 to 3 disclose the energy spectrum graphs according to this method).

The energy spectrum data may vary according to the nuclide of the material being a source to generate the radiation. Therefore, when it is already known which form of energy spectrum data is generated from which type of nuclide, it is possible in ideal to determine the nuclide of the source included in the target object based on the measured energy spectrum data.

Figure 2:
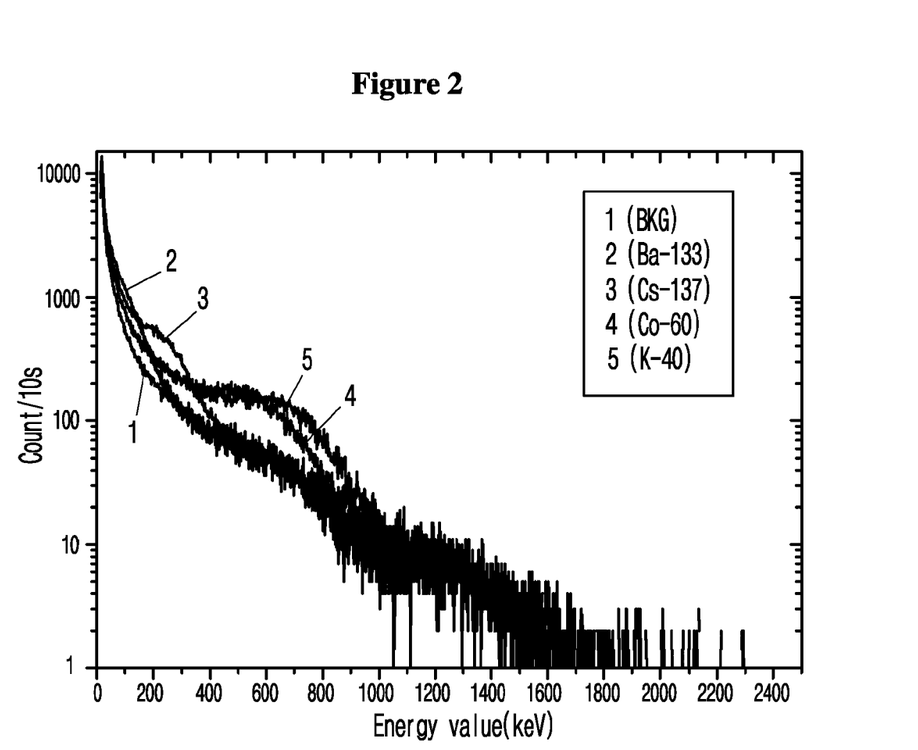
FIG. 2 is a graph showing the measurement result of the energy spectrum data with respect to various sources measured by the radiation detector using the plastic scintillator.

However, as shown in FIG. 2, it is not easy to distinguish the energy spectrum data depending on the radionuclides which are overlapped to each other, when the distinction is only based on the energy spectrum data depending on the energy.

Therefore, the present invention is provided to easily detect the radionuclide by introducing a novel equation and algorithm, as described in the following section.

To this end, according to the method for detecting the radionuclide, the Step 1 is a step (S100) of respectively calculating a count ratio for a particular energy value using a background energy spectrum data measured without a target object to detect the radionuclide and a target energy spectrum measured in the presence of the target object.

The count ratio can be defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

Figure 3A:
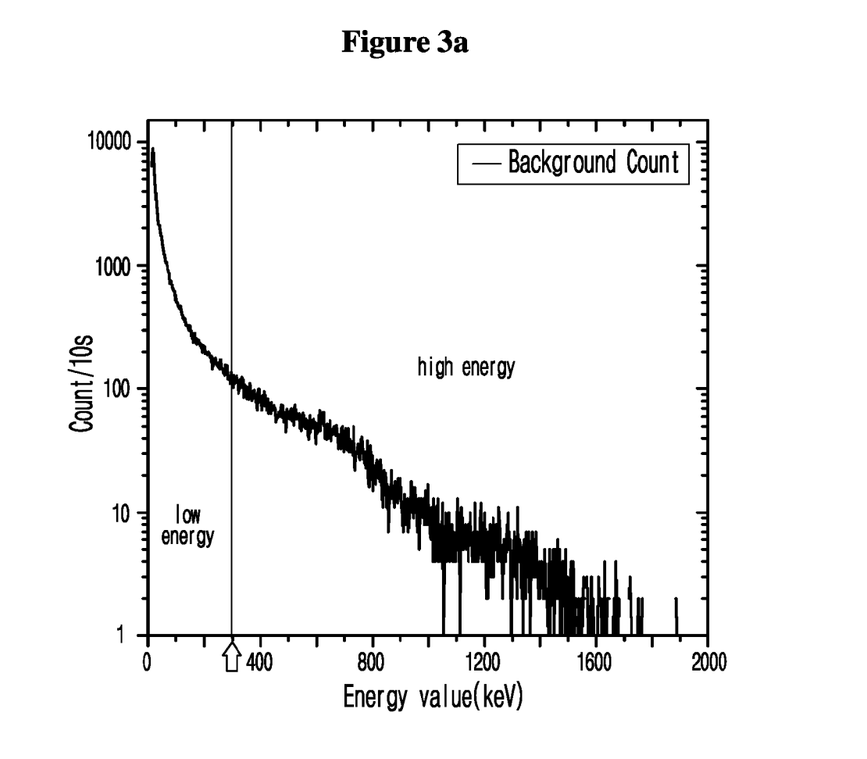
FIG. 3a is a graph illustrating a method for obtaining a low count sum and a high count sum using a specific energy spectrum data.
Figure 3B:
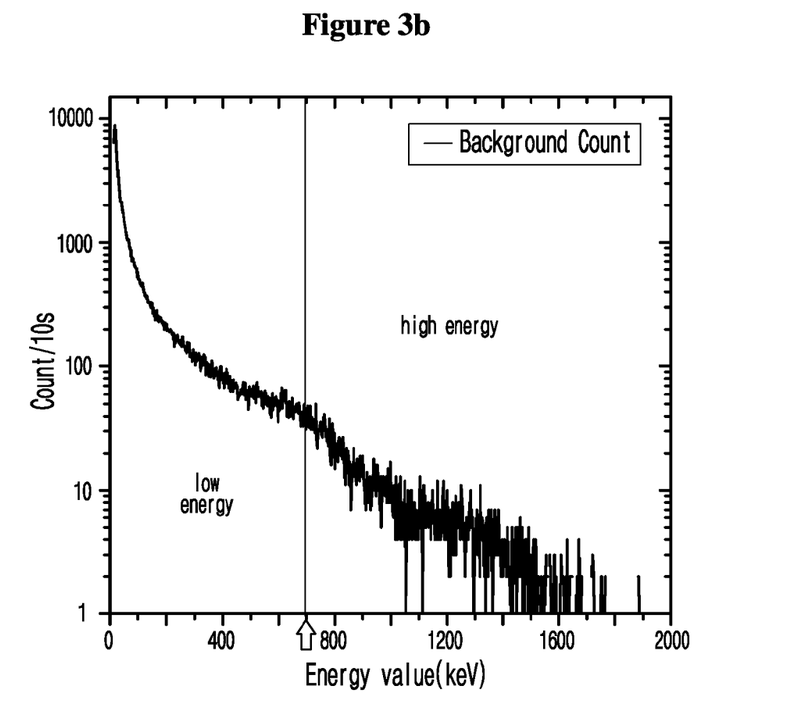
FIG. 3b is a graph illustrating a method for obtaining a low count sum and a high count sum using a specific energy spectrum data.

FIG. 3 describes a method for obtaining the low count sum and the high count sum using a spectrum data of specific energy. Although the energy spectrum data of FIG. 3 is the background energy spectrum data, the following method may be applied as it is, for a particular energy spectrum data such as the spectrum for other sources.

In FIG. 3, the particular energy value is marked by an arrow point. By the particular energy value, a low energy is the energy value which is the particular energy value or smaller or the energy value which is smaller than the particular energy value. The high energy is the energy value which is the particular energy value or greater or the energy value which is greater than the particular energy value. In the present invention, a low count sum is calculated by adding all the count values within the low energy, and a high count sum is calculated by adding all the count values within the high energy.

As described above, it is possible to obtain the low count sum and the high count sum with respect to the particular energy value, and the count ratio is defined as the ratio of the low count sum divided by the high count sum.

For example, referring to FIG. 3a, the particular energy value is about 320 keV, and the low count sum can be calculated by adding all the count values for each energy value in the low energy section. Also, the high count sum can be calculated by adding all the count values for each energy value in the high energy section which is the energy equal to or exceeding the particular energy value, i.e., 320 keV. Subsequently, the count ratio is calculated by dividing the calculated low count sum by the high count sum. The particular energy value in FIG. 3b is 680 keV, and the count ratio can be calculated using the same method.

Additionally, the type of the radiation detector may be a detector using a gas ionization, a detector using a solid ionization (a semiconductor detector), or a detector using an excitation, and preferably the detector using the excitation.

The detector using a gas ionization may be an ionization chamber, a proportional counter, a quenching gas or a Geiger Muller counter, but is not limited thereto.

The solid ionization detector (the semiconductor detector) may be, but is not limited to, a P-N junction detector, a surface barrier detector, a Li drifted (p-i-n type) detector or a high purity semiconductor detector.

The detector using the excitation emits a light of a proper wavelength when there is incident radiation with a particular luminescent material in the scintillator returning atom or molecule of the material to a base state after excitation. The light enters into photomultiplier through silicone grease or Lusite pipe so as to transfer Sb—Sc to electron on a deposited photoelectric surface, to amplify the same by a dynode to obtain the electrical signal. The scintillator may be an inorganic crystalline, an organic crystalline, a liquid type, or a plastic type, but is not limited thereto.

Step 2 is a step (S200) of comparing the background count ratio and the target object count ratio.

The above comparing step may comprise a step of searching an energy value with an identical count ratio, by comparing the background count ratio and the target object count ratio.

Additionally, the above step may further comprise a step of distinguishing the radionuclide detected from the target object by comparing the identical energy value identified in the above comparing step and a predefined energy value for each radionuclide.

The identical energy value identified in the above comparing step may not always be the same value as the predefined radionuclide energy value, and it is determined as the same radionuclide if the values are within the margin of error of about 20% after comparing the identical energy value identified in the above comparing step and the predefined radionuclide energy value.

Meanwhile, the predefined energy value for each radionuclide refers to the energy value stored previously for each radionuclide according to the first aspect of the present invention.

According to a second aspect of the present invention, the present invention provides a method for the detecting radionuclide using the energy spectrum data represented by the count depending on energy obtained from the radiation detector, comprising the steps of: respectively calculating a count ratio for a particular energy value using a background energy spectrum data measured without the target object to detect the radionuclide and a target energy spectrum measured in the presence of the target object; calculating a normalized count ratio for calculating a target object normalized count ratio represented by a normalized value depending on the energy from the target object count ratio, where the normalized value is defined as a ratio of the target object count ratio with respect to the particular energy value and the background count ratio; and searching the energy value where the normalized value is 1 in the target object normalized count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

That is, as in the first aspect of the present invention, the second aspect of the present invention also comprises a step of respectively calculating a count ratio for a particular energy value using the background energy spectrum data measured without the target object to detect the radionuclide and a target energy spectrum measured in the presence of the target object However, the second aspect of the present invention is distinguished from the first aspect of the present invention in that it further comprises a step of calculating a normalized count ratio and a step of searching the energy value where the normalized value is 1.

In the following part, the second aspect of the present invention is described in details by comparing to the first aspect regarding distinctions.

Above all, after performing the count ratio calculation for the particular energy value as in the first aspect of the present invention, the following step is to calculate a target object normalized count ratio represented by the normalized value depending on energy from the target object count ratio.

The normalized value is defined as the ratio of the target object count ratio value and the background count ratio value at a particular energy value. In the following part, a first normalized value refers to the value of the target object count ratio value divided by the background count ratio value, and a second normalized value refers to the value of the background count ratio value divided by the target object count ratio value.

The value of 1 of the step of searching the energy value is defined as 1 as the first or second normalized value obtained by a constant value depending on the energy, at the first or second normalized energy ratio data obtained from the background energy ratio data, instead of the target object energy ratio of the step of calculating the first or second normalized energy ratio data.

Also, regarding the method for detecting the radionuclide of the first and second aspects of the present invention, the step of calculating the count ratio may be performed by changing the energy value, and the count ratio may be defined within a predefined energy section, i.e., in a range of a predefined lower limit energy value to a predefined upper limit energy value.

Meanwhile, the lower limit energy value may be set to 0 or 1 in general. The energy value is a discrete value, and corresponds to so-called index. In general, for numbering the index, both 0 and 1 are widely used as a starting number, and thus the lower limit energy value may be 0 in case of the index numbering starting at 0, while the lower limit energy value may be 1 in case of the index numbering starting at 1.

Also, the upper limit energy value may be determined to be the maximum value among the actual energy values. However, as shown in FIG. 2, whereas the count value is relatively very high in a range of 100 to 10,000 when the energy value is in the range of 1 to 400, it is general that the count value decreases as the energy value increases. That is, referring to FIG. 2, the count value is only about 1 to 10 when the energy value is about 1,000 or more, and thus the influence is only minor in obtaining the low count sum value or the high count sum value as described above. In consideration to this, it is possible to properly determine the upper limit energy value to the energy value where the count value drops to about 10 or less. In an embodiment of the present invention, the entire range of the energy value is about 1 to 2,400 as shown in FIG. 2, the upper limit energy value may be set to about 1,000. Meanwhile, there are various cases of the entire range of the energy value being 1 to 512 or 1 to 1,024, for example, and the upper limit energy value may be determined to 256 or 512, etc. as appropriate.

In summary, the reason for determining the upper limit energy is to remove the energy with small values which does not significantly affect the final result value in sum while calculating the high count sum value, so as to reduce the load on calculating process. Therefore, the upper limit energy value needs to be properly determined as the energy value around the point where the count value drops to 10 or less, considering the above factors.

In this case, the count ratios for each energy value are obtained by changing the energy value from the lower limit energy value to the upper limit energy value. For example, FIG. 3a shows when the particular energy value is 320, and when the predefined energy section is in the range of 1 to 800, wherein the following formula may be applied:

the low count summation=(the count value when the energy value is 1+the count value when the energy value is 2+( . . . )+the count value when the energy value is 320);

the high count summation=(the count value when the energy value is 321+the count value when the energy value is 322+( . . . )+the count value when the energy value is 800); and the count ratio value when the energy value is 320= (the low count summation/the high count summation).

FIG. 3b shows when the random energy value is 680, wherein the following formula may be applied as above:

the low count summation=(the count value when the energy value is 1+the count value when the energy value is 2+( . . . )+the count value when the energy value is 680);

the high count summation=(the count value when the energy value is 681+the count value when the energy value is 682+( . . . )+the count value when the energy value is 800); and the count ratio value when the energy value is 680= (the low count summation/the high count summation).

In this manner, when the lower limit energy value is 1 and the upper limit energy value is 800, the count ratio values can be obtained when the energy values are 1, 2, ( . . . ), and 800.

Figure 4A:
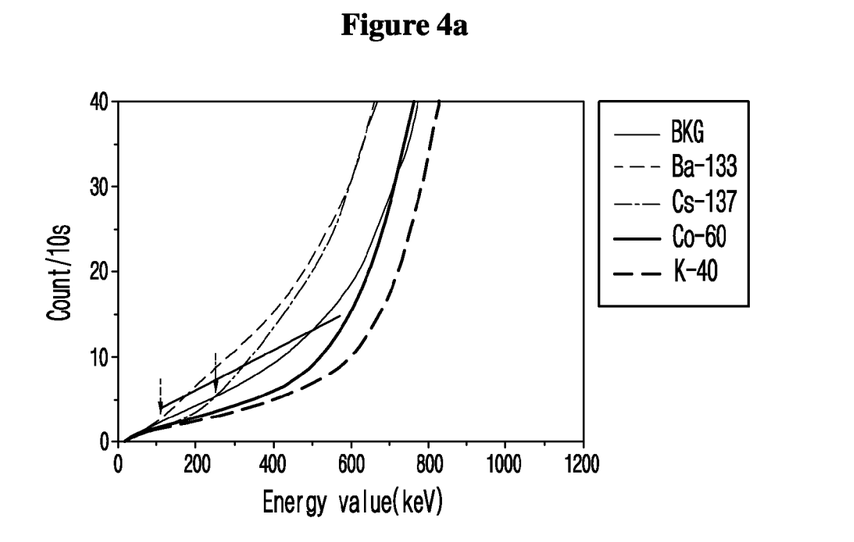
FIG. 4a of the present invention is a graph showing count ratios according to the energy values for various sources.
Figure 4B:
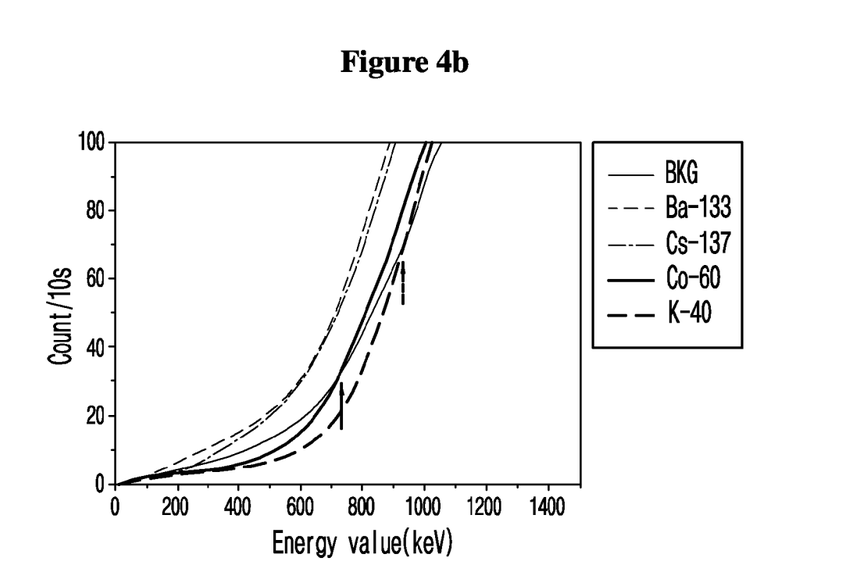
FIG. 4b of the present invention is a graph showing count ratios according to the energy values for various sources.

Referring to FIGS. 4a and 4b, it shows that the count ratio value for each radionuclide can be easily distinguished by showing the background count ratio and the target object count ratio with respect to the energy in a single graph, after calculating the count ratio using the background energy spectrum data and the target object energy spectrum data. Furthermore, since the count ratio for each radionuclide and the background count ratio will intersect for a single time at a predefined energy value, it is possible to identify the type of the radionuclide included in the target object by finding the intersecting energy value.

For example, referring to FIG. 4a, the count ratio of Ba-133 is intersecting with the background count ratio at the energy value of about 100. Referring to FIG. 4b, it is identified that the count ratio of Co-60 is intersecting with the background count ratio at the energy value of about 720. Therefore, the radionuclide of a specific radiation source can be determined by reading the energy value of the intersecting point, since the count ratio of a specific radiation source energy will intersect with the background count ratio only once on the graph.

Figure 5A:
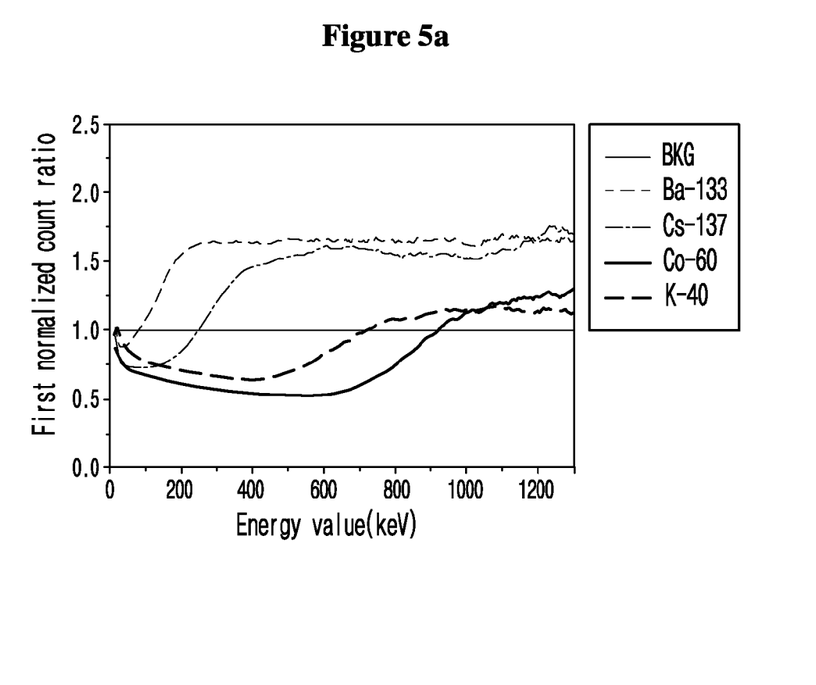
FIG. 5a is a graph showing normalized count ratios according to the energy values for various sources, according to the present invention.
Figure 5B:
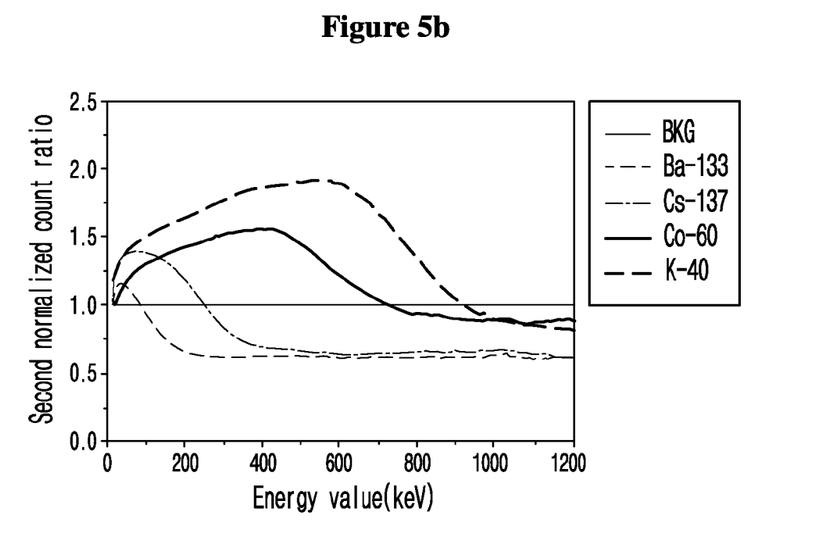
FIG. 5b is a graph showing normalized count ratios according to the energy values for various sources, according to the present invention.

Additionally, referring to FIGS. 5a and 5b, FIG. 5a is a graph showing a first normalized count ratio represented as a first normalized value depending on the energy, and FIG. 5b is a graph showing a second normalized count ratio represented as a second normalized value depending on the energy. In a low energy section, the first normalized count ratio has the first normalized value smaller than 1, but the second normalized count ratio has the second normalized value greater than 1. Meanwhile, as moving to a high energy section, both of the graphs respectively shows a high or low normalized value after passing the normalized value of 1.

That is, the method for detecting the radionuclide according to the second aspect of the present invention may be provided to detect the same by searching the energy value where the normalized value is 1, since the normalized count ratio of the target object will definitely include the point where the normalized value becomes 1.

More specifically, using the method described in the first aspect of the present invention, the radionuclide detected from the target object can be distinguished by comparing the energy value obtained in the step of searching the energy value where the normalized value is 1 and a predefined energy value for each radionuclide where the normalized value is 1, wherein the predefined normalized energy value for each radionuclide where the normalized value is 1 is the energy value previously stored by each radionuclide according to the second aspect of the present invention.

The energy value where the normalized value is 1 may not always be an identical value as the predefined radionuclide energy value, and it is determined as the same radionuclide if the values are within the margin of error of about 20% after comparing the energy value with the normalized value being 1 and the predefined radionuclide energy value.

According to a third aspect of the present invention, the present invention provides a process of detecting the radionuclide using the method of detecting the radionuclide of claim 1 and a radiation detector, comprising the steps of:

measuring an energy spectrum data of measuring a background energy spectrum data without an object using the radiation detector, and a target energy spectrum data with the target object using the radiation detector; and detecting the radionuclide by sequentially calculating the count ratio when a count of the target energy spectrum data is a detection reference value or greater, and comparing the count ratio.

According to a fourth aspect of the present invention, the present invention provides a process of detecting the radionuclide using the method of detecting the radionuclide of claim 1 and a radiation detector, comprising the steps of:

measuring an energy spectrum data of measuring a background energy spectrum data without an object using the radiation detector, and a target energy spectrum data with the target object using the radiation detector; and detecting the radionuclide by sequentially calculating the count ratio when the count of the target energy spectrum data is a detection reference value or greater, calculating a normalized count ratio, and searching the energy value where the normalized value is 1.

Figure 6:
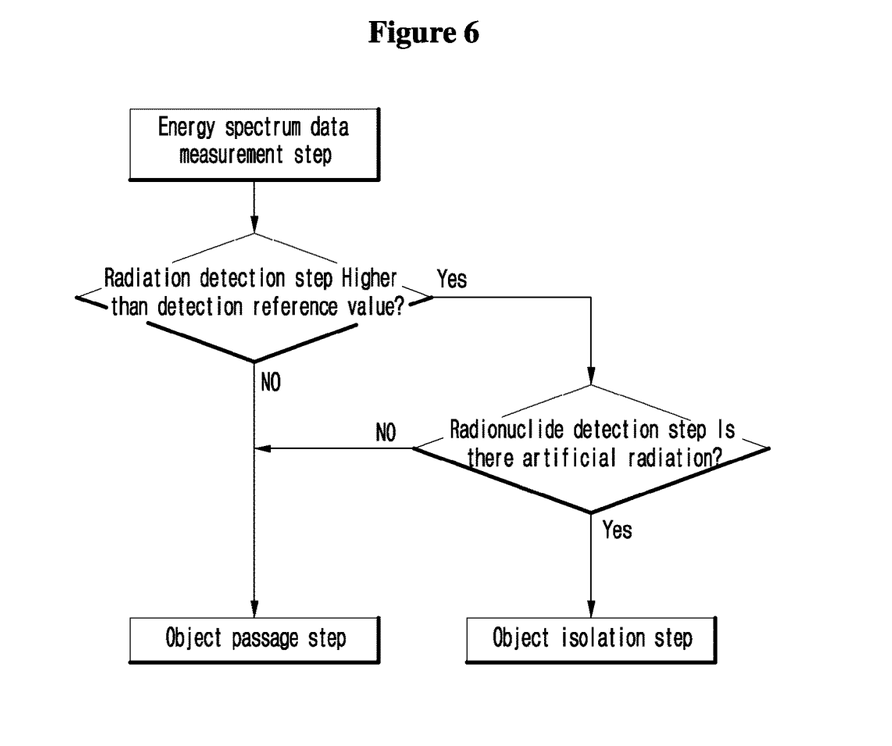
FIG. 6 is a schematic view showing a process for detecting the radionuclide, according to the present invention.

FIG. 6 shows the third and fourth aspects of the present invention, which respectively shows the application of the method for detecting the radionuclide according to the first and second aspects of the present invention. The third and fourth aspects of the present invention are provided to measure the background energy spectrum data without the target object by the radiation detector, and the target energy spectrum data with the target object, before performing the method for detecting the radionuclide.

Subsequently, when the count of the target energy spectrum data is the detection reference value or greater, the methods for detecting the radionuclide of the first and second aspects are respectively performed according to the third and fourth aspects, so as to detect the radionuclide.

The detection reference value may be set to about 1.2. That is, if the count of the target energy spectrum is 1.2 times or greater than the count of the background spectrum data, it is determined that the target object is suspicious of including the artificial radioactive material. The detection reference value of 1.2 means increase by 20% or more when compared to the background count, and the detection reference value may be changed depending on an individual or entity of operating the device.

For example, if the count value is 10,000 for the background condition and the count value becomes 11,500 after introducing the target object, the target object is determined to be safe as emitting the radiation in the range of natural radiation. In this case, when the count value of the background spectrum data is smaller than the count value of the target spectrum data, an object passage step is performed to pass the target object by determining as not including radioactive material.

In contrast, if the count value is 10,000 for the background condition and the count value becomes 12,500 after introducing the target object, the target object is determined to be in need of a precise inspection whether the artificial radioactive material is included, as emitting the radiation greater than the natural radiation.

Meanwhile, it is possible to determine whether the target object includes the artificial radioactive material using the method for detecting the radionuclide according to the first or second aspect of the present invention. That is, if the count ratio of the background spectrum data and the target spectrum data is the detection reference value or greater, the method for detecting the radionuclide of the first or second aspect may be performed, so as to identify whether the target object includes the artificial radioactive material by detecting the radionuclide.

If the target object is determined not to include the artificial radiation in the radionuclide detecting step, the target object is considered to be safe as not including the artificial radioactive material although the target object emits the radiation of somewhat high intensity, and thus the target object can be passed through an inspection device.

If the target object is determined to include artificial radiation in the radionuclide detecting step, an object isolation step is performed to transfer the target object to an isolated inspection device prepared for an additional handling. The target object transferred to the isolated inspection device will be treated with the additional handling such as more precise inspection in a state safely isolated from an external environment.

According to a fifth aspect of the present invention, the present invention provides a radiation detector of measuring the background energy spectrum without the target object and the target energy spectrum with the target object, comprising:

a calculating unit for performing a count ratio calculation with respect to the particular energy value using the energy spectrum data represented by the count for the energy obtained from the radiation detector; and a determining unit for distinguishing the radionuclide by comparing the background count ratio and the target object count ratio, wherein the count ratio is defined as a ratio of a low count sum of count values which is a particular energy value or less divided by a high count sum of the count values which is greater than the particular energy value, or a ratio of the low count sum of the count values which is smaller than the particular energy value divided by the high count sum of the count values which is the particular energy value or greater.

Figure 7:
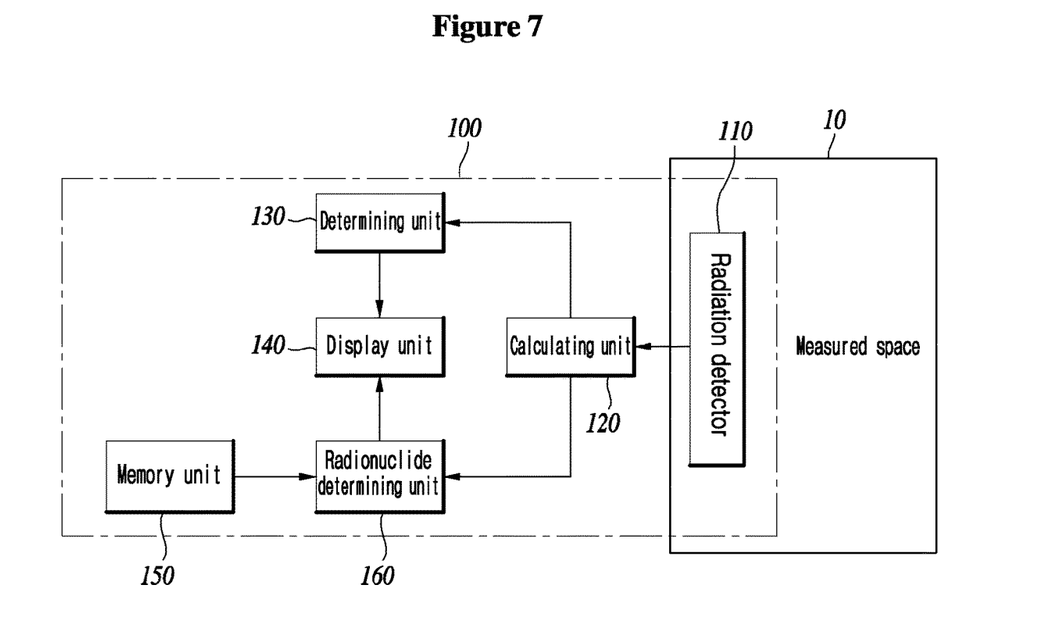
FIG. 7 is a block diagram schematically showing the radiation detector, according to the present invention.

The radiation detector is described in details, with reference to FIG. 7.

Referring to FIG. 7, the radiation detector 100 comprises a radiation detector 110 for measuring a background energy spectrum data without the object and a target energy spectrum data in the presence of the object, a calculating unit 120 for performing a count ratio calculation with respect to a particular energy value using the energy spectrum data represented by the count for the energy obtained from the radiation detector 110, and a determining unit 130 to distinguish the radionuclide by comparing the background count ratio and the target count ratio.

Additionally, the radiation detector 100 further comprises a display unit 140 to show the radionuclide for a user to recognize the same after identifying the radionuclide.

Meanwhile, the radiation detector 100 according to the present invention further comprises a memory unit 150 for storing data for each radionuclide, and a nuclide determining unit 160 to distinguish the radionuclide corresponding to the data for each radionuclide stored in the memory unit 150 so as to determine the radionuclide.

The memory unit 150 is provided to achieve the data for each radionuclide using the radiation identifying method in advance, to categorize and store the same. The above data may be achieved using a plurality of experiments, to secure the data for each radionuclide.

Upon determining the radionuclide at the nuclide determining unit 160, the display unit 140 is provided to display the same to enable the user to recognize them. Therefore, when the detection result shows a harmful radionuclide to human body, it is possible to control to isolate the same.

With the above configuration, the existing radiation detector 110 can be used as it is. Additionally, the radiation detector 110 can rapidly scan the measured space so as to obtain the data.

In addition, since the calculating unit 120, the determining unit 130 and the nuclide determining unit 160 can provide the result value through a simple calculation, it is possible to process the data obtained through the radiation detector 110 in real-time, to determine the radionuclide and inform the user whether there is artificial radiation.

For example, when a large amount of products are imported using a ship, there was a problem of relatively low reliability due to the sampling of a predefined number of products to measure whether there is radiation or not. However, the reliability may be improved by scanning all containers loaded on the ship using the radiation detector 100 of the present invention to obtain the result in a rapid and accurate manner, allowing the search for all imported objects.

INDUSTRIAL APPLICABILITY

According to the method for detecting the radionuclide of the present invention, it is possible to determine the nuclide in a highly effective and easy manner even for a radiation of lower energy level, by introducing a novel equation and algorithm. Furthermore, the method may be promptly applied to an existing radiation detection system by introducing the novel equation and algorithm of the present invention, with no need for adopting an additional device or component to the existing system, with a maximized compatibility with the existing radiation detection system.

Additionally, the method has effects in an expanded usage to a variety of target objects such as cargo shipping, radiation wastes, and foods, etc., with the advantage of easily detecting the radionuclide.

The invention claimed is:

1. A method for detecting a radionuclide using energy spectrum data represented by a count depending on energy obtained from a radiation detector, comprising:
respectively calculating a count ratio for an energy value using a background energy spectrum data measured without a target object to detect the radionuclide and a target energy spectrum measured in the presence of the target object; and
comparing a background count ratio and a target object count ratio,
wherein the count ratio is defined as a ratio of a low count sum of count values which is the energy value or less divided by a high count sum of the count values which is greater than the energy value, or a ratio of the low count sum of the count values which is smaller than the energy value divided by the high count sum of the count values which is the energy value or greater.

2. The method for detecting the radionuclide as claimed in claim 1, further comprising:

searching the energy value having an identical count ratio by comparing the background count ratio and the target object count ratio.

3. The method for detecting the radionuclide as claimed in claim 2, further comprising:

distinguishing the radionuclide detected from the target object by comparing the energy value searched in the searching step and a predefined energy value for radionuclides.

4. The method for detecting the radionuclide in claim 1, wherein calculating the count ratio is performed by changing the energy value.

5. The method for detecting the radionuclide in claim 1, wherein the count ratio is defined within a predefined particular energy section.

6. A method for detecting a radionuclide using energy spectrum data represented by a count depending on energy obtained from a radiation detector, comprising:

respectively calculating a count ratio for an energy value using a background energy spectrum data measured without the target object to detect the radionuclide and a target energy spectrum measured in the presence of the target object;

calculating a normalized count ratio for calculating a target object normalized count ratio represented by a normalized value depending on the energy from a target object count ratio, where the normalized value is defined as a ratio of the target object count ratio with respect to the energy value and a background count ratio; and searching the energy value where the normalized value is 1 in the target object normalized count ratio, wherein the count ratio is defined as a ratio of a low count sum of count values which is the energy value or less divided by a high count sum of the count values which is greater than the energy value, or a ratio of the low count sum of the count values which is smaller than the energy value divided by the high count sum of the count values which is the energy value or greater.

7. The method for detecting the radionuclide in claim 6, further comprising:

distinguishing the radionuclide detected from the target object by comparing an energy value obtained by searching the energy value where the normalized value is 1 and the predefined energy values for radionuclides where the normalized value is 1.

8. A radiation detector for measuring a background energy spectrum without a target object and a target energy spectrum with the target object, comprising:

a calculating unit for performing a calculation of a count ratio with respect to an energy value using energy spectrum data represented by a count for energy obtained from the radiation detector; and a determining unit for distinguishing the radionuclide by comparing a background count ratio and a target object count ratio, wherein the count ratio is defined as a ratio of a low count sum of count values which is the energy value or less divided by a high count sum of the count values which is greater than the energy value, or a ratio of the low count sum of the count values which is smaller than the energy value divided by the high count sum of the count values which is the energy value or greater.

* * * * *